United States Patent
Kyakuno

(10) Patent No.: US 10,339,704 B2
(45) Date of Patent: Jul. 2, 2019

(54) IMAGE DATA PROCESSING METHOD IN IMAGE PROCESSOR AND COMPUTER READABLE MEDIUM STORING PROGRAM THEREFOR FOR RENDERING A TEXTURE BASED ON A TRIANGULATION PATTERN

(71) Applicant: AXELL CORPORATION, Tokyo (JP)

(72) Inventor: Kazuki Kyakuno, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 58 days.

(21) Appl. No.: 15/830,341

(22) Filed: Dec. 4, 2017

(65) Prior Publication Data

US 2019/0172256 A1 Jun. 6, 2019

(51) Int. Cl.
*G06T 15/04* (2011.01)
*G06T 15/80* (2011.01)
*G06T 15/00* (2011.01)

(52) U.S. Cl.
CPC .......... *G06T 15/80* (2013.01); *G06T 15/005* (2013.01); *G06T 15/04* (2013.01); *G06T 2210/52* (2013.01)

(58) Field of Classification Search
CPC ........... G06T 15/00; G06T 15/04; G06T 1/20; G06T 1/60
See application file for complete search history.

(56) References Cited

U.S. PATENT DOCUMENTS 5,995,110 A * 11/1999 Litwinowicz ........... G06T 15/04
715/848

6,674,430 B1   1/2004 Kaufman et al.
2002/0158880 A1 * 10/2002 Williams ................ G06T 15/04
345/582

FOREIGN PATENT DOCUMENTS

JP    2002-520748    7/2002
JP    2013-251717   12/2013

OTHER PUBLICATIONS

Yu et al., "Image Reconstruction Using Data-Dependent Triangulation", IEEE Computer Graphics and Applications, 21(3): 62-68 (2001).

* cited by examiner

*Primary Examiner* — Ryan McCulley
(74) *Attorney, Agent, or Firm* — Wenderoth, Lind & Ponack, L.L.P.

(57) ABSTRACT

An image data processing method in an image processor includes: a vertex shader which determines, based on received vertex data of a polygon, positions on a display unit corresponding to the vertex data; a rasterizer which determines pixels on the display unit that are necessary to display, on the display unit, an image in which a designated texture is mapped on the polygon based on positions of apices on the display unit determined by the vertex shader; and a pixel shader which determines, whenever information indicating a position of an individual pixel on the display unit where to determine a pixel value is received from the rasterizer, a pixel value of the position through interpolation using values of prescribed texture pixels around the position to display, on the display unit, the image in which the designated texture is mapped on the polygon, and the pixel shader is as defined herein.

8 Claims, 21 Drawing Sheets

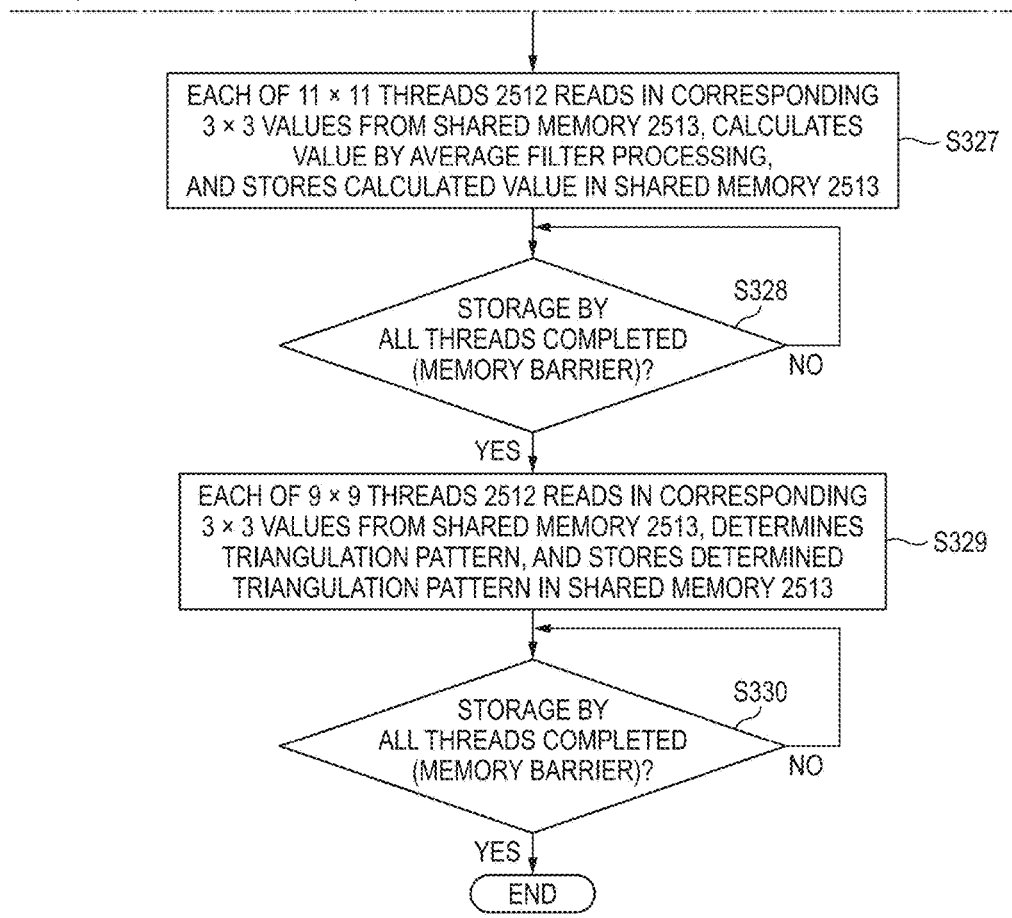

IMAGE DATA PROCESSING METHOD IN IMAGE PROCESSOR AND COMPUTER READABLE MEDIUM STORING PROGRAM THEREFOR FOR RENDERING A TEXTURE BASED ON A TRIANGULATION PATTERN

FIELD OF THE INVENTION

The present invention relates to an image data processing method in an image processor and a computer readable medium storing a program therefor. More particularly, the invention relates to an image data processing method in an image processor incorporating a programmable shader and a computer readable medium storing a program therefor.

BACKGROUND OF THE INVENTION

In three-dimensional (3D) computer graphics, it is a common practice to generate an object to be drawn using a polygon model that is expressed by a number of polygons. In polygon model rendering processing, shading processing of shading polygon surfaces and texture mapping processing of pasting a texture image to a surface of the polygon model are performed.

In the early years of 3D computer graphics, to attain high-speed processing, the above kinds of processing were implemented by fixed pipelines using dedicated hardware circuits. However, with development of new technologies, to improve expressiveness, conversion from 3D coordinates to 2D coordinates and shading processing have been made programmable and overall devices have come to exhibit features of a "processor." Such devices have come to be called an image processor (e.g., GPU (graphic processing unit)) as opposed to CPU.

In GPUs, customarily, a function unit that performs coordinate conversion to texture mapping is called, as a whole, a "shader". Its constituent pieces of processing have become programmable and users are now capable of selectively performing various kinds of shading processing freely and variably. More specifically, vertex-by-vertex drawing of polygons has become programmable first and then vertex-by-vertex drawing of polygons after rasterization has become programmable. Most recently, GPUs having a configuration called "compute shader" have appeared in which programmable functional portions in the GPU can also be used for not only image processing but also general-purpose calculations.

SUMMARY OF THE INVENTION

Incidentally, in rendering processing of GPUs as described above, processing of enlarging, reducing, or deforming a texture image is performed in pasting the texture image to a polygon. And these kinds of processing (enlargement, reduction, and deformation) use bilinear filtering or bicubic filtering (refer to JP-T-2002-520748 (The symbol "JP-T" as used herein means a published Japanese translation of a PCT patent application), for example).

However, the above kinds of processing using bilinear filtering or bicubic filtering have problems that an object is blurred as a whole because its oblique edges are made shaggy.

On the other hand, a triangulation technique that interpolate pixels by dividing an image region into triangles, a typical one of which is data-dependent triangulation has been proposed as a high-quality enlargement technique (refer to X. Yu, B. S. Morse, and T. W. Sederberg, "Image Reconstruction Using Data-Dependent Triangulation," IEEE Computer Graphics and Applications, Vol. 21, No. 3, pp. 62-68, May/June (2001), for example). This is a technique of determining sampling (reference) pixel points to be used for calculating values of interpolation pixels by dividing each grid-like region having pixels as apices by repeating division using a cost function and what is called "edge swapping" over the region.

For example, JP-A-2013-251717 is known as a technique in which the above triangulation technique is applied to image enlargement processing. JP-A-2013-251717 discloses an image display processing device and an image display processing method in which a triangulation technique is employed in interpolation processing that is used in rendering of 2D computer graphics processing and image data expanded by a decoder and division patterns of respective regions determined by a triangulation evaluation circuit are stored in an image memory in such a manner that the former is correlated with the latter. If there exist pixels whose values should be determined by interpolation, information about a division pattern of a grid region including each pixel to be interpolated and prescribed pixel values relating to the grid are read from the image memory and a value of the pixel to be interpolated is determined.

However, in the technique of JP-A-2013-251717, 2D image data that are produced by the decoder line by line or block by block are input sequentially, data processed by applying the triangulation technique to the input data are stored in a memory such as a work buffer, and interpolation data are obtained by a rendering circuit's accessing the data stored in the work buffer. As such, this processing is different, in terms of a prerequisite configuration, from processing in which a texture having a particular address for texture mapping is specified as UV values as in rendering circuits of 3D computer graphics.

That is, where interpolation data having desired sets of coordinates are required randomly as in texture mapping of 3D computer graphics, image data cannot be processed sequentially unlike in the technique of JP-A-2013-251717 and a work buffer for storing division pattern information is necessary. The technique of JP-A-2013-251717 cannot be used in the case where a work buffer cannot be used due to a restriction relating to a renderer or the like that occurs in, for example, a case that an interpolation method is given, as a pixel shader, to a material of a 3D renderer such as Unity which is a game development engine.

Furthermore, a mode in which interpolation data having desired sets of block coordinates are required randomly block by block as in a case that a compute shader is installed and used is different in prerequisites from the technique of JP-A-2013-251717, and hence it is necessary to search for a new method for applying that technique.

The present invention has been made in the above circumstances, and an object of the invention is therefore to provide an image data processing method and a program therefor, capable of producing a smoother enlarged image because of employment of a triangulation technique, in an image processor having a programmable shader function.

An image data processing method being performed in an image processor in the invention comprises: a vertex shader which determines, on the basis of received vertex data of a polygon, positions on a display unit corresponding to the vertex data; a rasterizer which determines pixels on the display unit that are necessary to display, on the display unit, an image in which a designated texture is mapped on the polygon on the basis of positions of apices on the display unit determined by the vertex shader; and a pixel shader which determines, whenever (every time) information indicating a position of an individual pixel on the display unit where to determine a pixel value is received from the rasterizer, a pixel value of the position through interpolation using values of prescribed texture pixels around the position to display, on the display unit, the image in which the designated texture is mapped on the polygon, characterized in that: the pixel shader determines a triangulation pattern of a triangulation technique that relate to a pixel grid, including the position, of the texture on the basis of pixels constituting the pixel grid and pixels around the pixel grid, and determines a pixel value of the position through interpolation using the values of the prescribed texture pixels around the position on the basis of the determined triangulation pattern.

It is preferable that, in determining a triangulation pattern, the pixel shader calculates gradient values of values of pixels constituting each grid and values of pixels around the grid while performing lowpass filter processing thereon.

Further, it is preferable that, in determining a triangulation pattern, the pixel shader provisionally determines a triangulation pattern for a pixel grid, including the position, of the texture and triangulation patterns for grids located over, under, on the left of, and on the right of the pixel grid, and, if the provisionally determined triangulation pattern for the pixel grid, including the position, of the texture does not conform to the provisionally determined triangulation patterns for the grids located over, under, on the left of, and on the right of the pixel grid corresponding to the thread, finally determines a triangulation pattern for the pixel grid, including the position, of the texture by causing the former to conform to the latter.

An image processing program for causing an image processor to perform rendering processing in the invention, causes the image processor to execute: a vertex shader process of determining, on the basis of received vertex data of a polygon, positions on a display unit corresponding to the vertex data; a rasterizer process of determining pixels on the display unit that are necessary to display, on the display unit, an image in which a designated texture is mapped on the polygon on the basis of positions of apices on the display unit determined by the vertex shader process; and a pixel shader process of determining, whenever information indicating a position of an individual pixel on the display unit where to determine a pixel value is received from the rasterizer process, a pixel value of the position through interpolation using values of prescribed texture pixels around the position to display, on the display unit, the image in which the designated texture is mapped on the polygon, characterized in that: the pixel shader which determines a triangulation pattern of a triangulation technique that relate to a pixel grid, including the position, of the texture on the basis of pixels constituting the pixel grid and pixels around the pixel grid, and determines a pixel value of the position through interpolation using the values of the prescribed texture pixels around the position on the basis of the determined triangulation pattern.

An image data processing method in an image processor in the invention has a compute shader having multiple compute units and performs rendering processing, characterized in that: the multiple compute units process, in parallel, divisional textures that are produced by dividing a texture and of which the multiple threads are in charge, respectively, and each of the multiple compute units has multiple threads which operate in parallel according to a program; each of the multiple compute units determines, collectively, using the multiple threads, triangulation patterns to be used for a triangulation technique for a prescribed number of grids among grids that are formed by pixels constituting the divisional texture, on the basis of values of the pixels constituting the divisional texture; each of the multiple compute units determines positions, corresponding to pixel positions on a buffer that stores an enlarged image, in the prescribed number of grids, (e.g., to display, on a display unit, an image in which the texture is mapped on a polygon); and each of the multiple compute units determines, using a thread corresponding to each grid, a value of a pixel on the display unit corresponding to a position included in the grid through interpolation using values of peripheral pixels in the divisional texture on the basis of the triangulation pattern determined for the grid.

It is preferable that, in determining triangulation patterns collectively, the multiple threads perform processing while storing values obtained during the course of the processing in a memory that is shared by the multiple threads.

Further, it is preferable that, in determining triangulation patterns collectively using the multiple threads, each of the multiple compute units calculates gradient values of values of pixels constituting each grid and values of pixels around the grid while performing lowpass filter processing thereon; and that each of the multiple compute units is assigned, in an overlapped manner, boundary portions of adjoining divisional textures by such an amount that the number of triangulation patterns determined is reduced by the lowpass filter processing so as to become small relative to the number of pixels used of the divisional texture.

Further, it is preferable that, in determining triangulation patterns collectively using the multiple threads, each of the multiple compute units provisionally determines a triangulation pattern for a grid corresponding to each thread and triangulation patterns for grids located over, under, on the left of, and on the right of the grid corresponding to the thread, and, if the provisionally determined triangulation pattern for the grid corresponding to the thread does not conform to the provisionally determined triangulation patterns for the grids located over, under, on the left of, and on the right of the grid corresponding to the thread, finally determines a triangulation pattern for the grid corresponding to the thread by causing the former to conform to the latter.

An image data processing program in the invention is for causing an image processor having multiple compute units that can operate in parallel and each of which has multiple threads capable of operating in parallel to perform rendering processing on the basis of information of a 3D model formed by polygons and information of a texture to be pasted to the 3D model, characterized by comprising the steps of: causing assignment of multiple divisional textures produced by dividing the texture to the respective compute units; causing the multiple threads to determine, collectively, triangulation patterns to be used for a triangulation technique for a prescribed number of grids among grids that are formed by pixels constituting the divisional texture, on the basis of values of the pixels constituting the divisional texture; causing each of the multiple compute units to determine positions, corresponding to pixel positions on a buffer that stores an enlarged image, in the prescribed number of grids, (e.g., to display, on a display unit, an image in which the texture is mapped on a polygon); and causing each thread corresponding to a grid to determine a value of a pixel on the display unit corresponding to a position included in the grid through interpolation using values of peripheral pixels in the divisional texture on the basis of the triangulation pattern determined for the grid.

The image data processing method and the program therefor in an image processor according to the invention makes it possible to produce a smoother enlarged image because of employment of a triangulation technique, in an image processor having a programmable shader function.

In particular, where the image processor is equipped with a compute shader, multiple triangulation patterns of a triangulation technique can be obtained collectively, whereby values of pixels that are necessary for display of a display unit can be determined collectively.

Furthermore, noise etc. can be eliminated because gradient values of the values of pixels constituting each grid and pixels around it are calculated while the values of those pixels are subjected to lowpass filter processing in determining a triangulation pattern for the grid.

DESCRIPTION OF SYMBOLS

Figure 1:
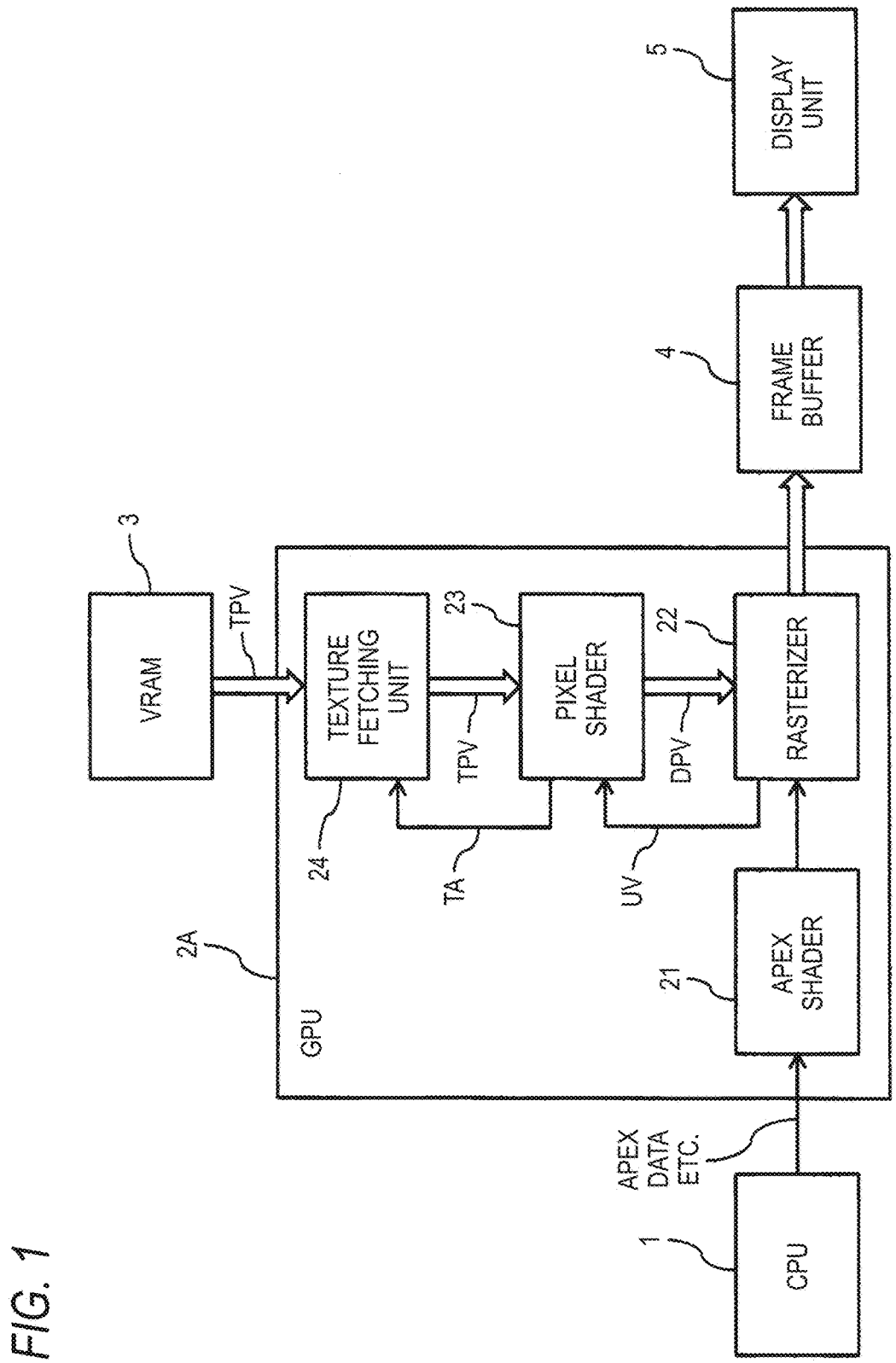
FIG. 1 is a block diagram showing the configuration of an image processing apparatus in which the image data processing method and the program therefor of the invention are embodied.

1: CPU
2A, 2B: GPU
21: Vertex shader
22: Rasterizer
23: Pixel shader
24: Texture fetching unit
25: Compute shader
251: Compute unit
2511: Texture fetching unit
2512: Thread
2513: Shared memory
26: Dispatcher
3: VRAM
4: Frame buffer
5: Display unit

DETAILED DESCRIPTION OF THE INVENTION

Embodiments of the present invention will be hereinafter described in detail with reference to the drawings.

Embodiment in GPU Having Programmable Pixel Shader Function

FIG. 1 is a block diagram showing the configuration of an image processing apparatus in which the image data processing method and the program therefor of the invention are embodied.

The image processing apparatus shown in FIG. 1 is equipped with a display unit 5 on which a 3D graphics image is displayed; a VRAM 3 which is stored with data of multiple textures; a CPU 1 which supplies vertex data of a 3D model formed by polygons and information indicating each texture to be pasted; a GPU 2A which determines pixels corresponding to a range of display on the display unit 5 from the vertex data and reads in data of each designated texture from the VRAM 3 on the basis of the vertex data and the information indicating each texture supplied form the CPU 1, calculates values of the determined pixels on the basis of the read-in texture data, and outputs the calculated pixel values; and a frame buffer 4 which is disposed upstream of the display unit 5 and stores pixel data that are output from the GPU 2A.

The GPU 2A has a vertex shader 21, a rasterizer 22, a pixel shader 23, and a texture fetching unit 24. What is called a rendering process that is executed in the GPU 2A will be described in detail with reference to FIGS. 2-10 together with FIG. 1. All of the vertex shader 21, the rasterizer 22, and the pixel shader 23 are programmable.

The vertex shader 21 performs various kinds of coordinate conversion on vertex data supplied from the CPU 1, and determines their display positions (sets of coordinates) on the display unit 5.

Figure 2A:
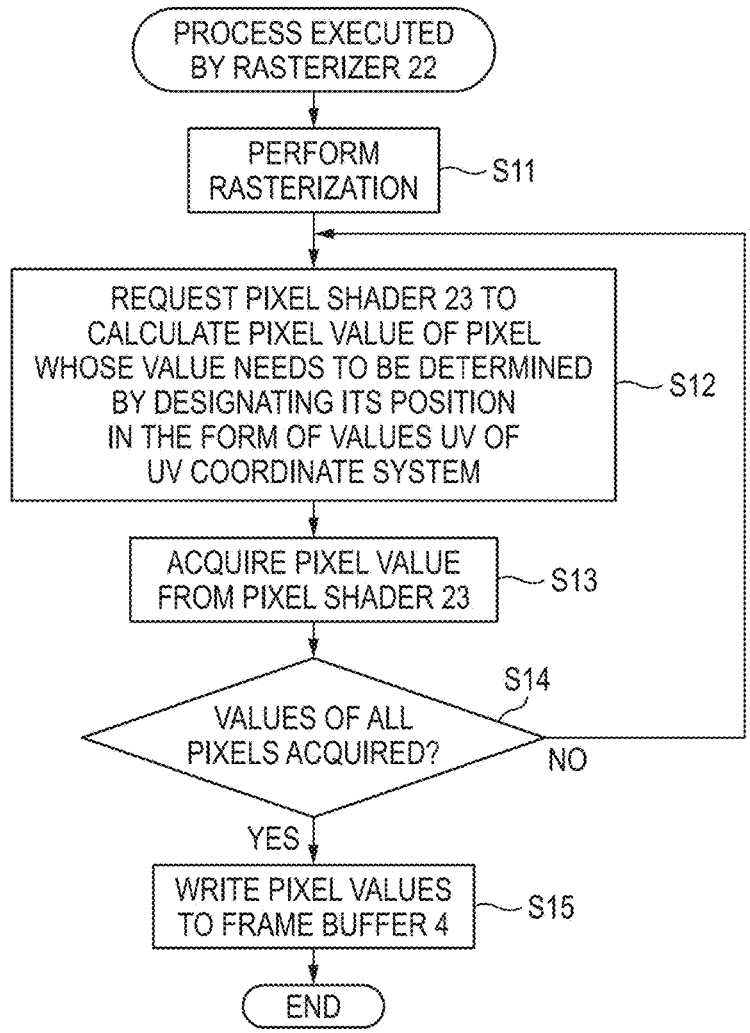
FIG. 2A is a flowchart showing the procedure of a process executed by a rasterizer 22.
Figure 2B:
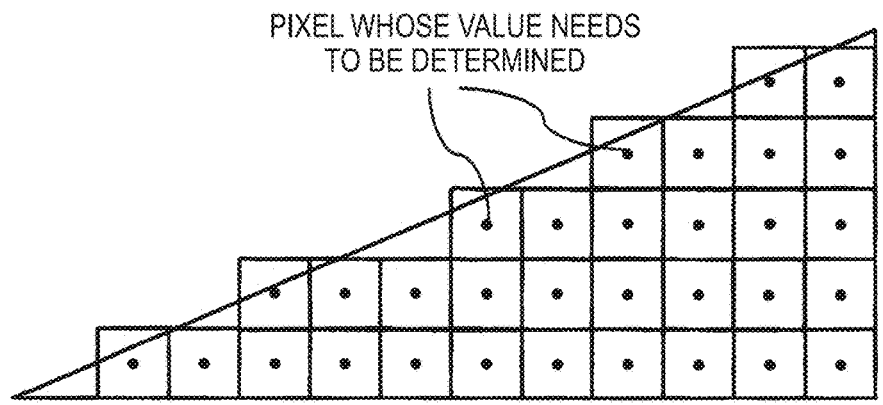
FIG. 2B illustrates rasterization processing.

FIG. 2A is a flowchart showing the procedure of a process executed by the rasterizer 22, and FIG. 2B illustrates rasterization processing. First, at step S11, the rasterizer 22 performs rasterization processing (see FIG. 2B) on vertex data on the display unit 5 supplied from the vertex shader 21 and derives pixels whose values need to be determined. FIG. 2B shows an example that a value of a pixel whose center is located inside a boundary that is derived from the vertex data needs to be determined. At step S12, the rasterizer 22 requests the pixel shader 23 to calculate a pixel value of a pixel whose value needs to be determined by giving the pixel shader 23 its position in the form of values UV (0-1, 0-1) of a texture UV coordinate system. At step S13, the rasterizer 22 acquires the pixel value of the pixel whose value needs to be determined.

If pixel values of all pixels whose values need to be determined have been acquired (S14: yes), the process moves to step S15, where the rasterizer 22 writes the acquired pixel values to the frame buffer 4 for the purpose of display on the display unit 5. Although for convenience of description the procedure shown in FIG. 2 is such that all pixel values are supplied to the frame buffer 4 together after they are acquired, it is also conceivable to supply each pixel value to the frame buffer 4 individually whenever it is acquired. Either procedure may be employed.

Figure 3:
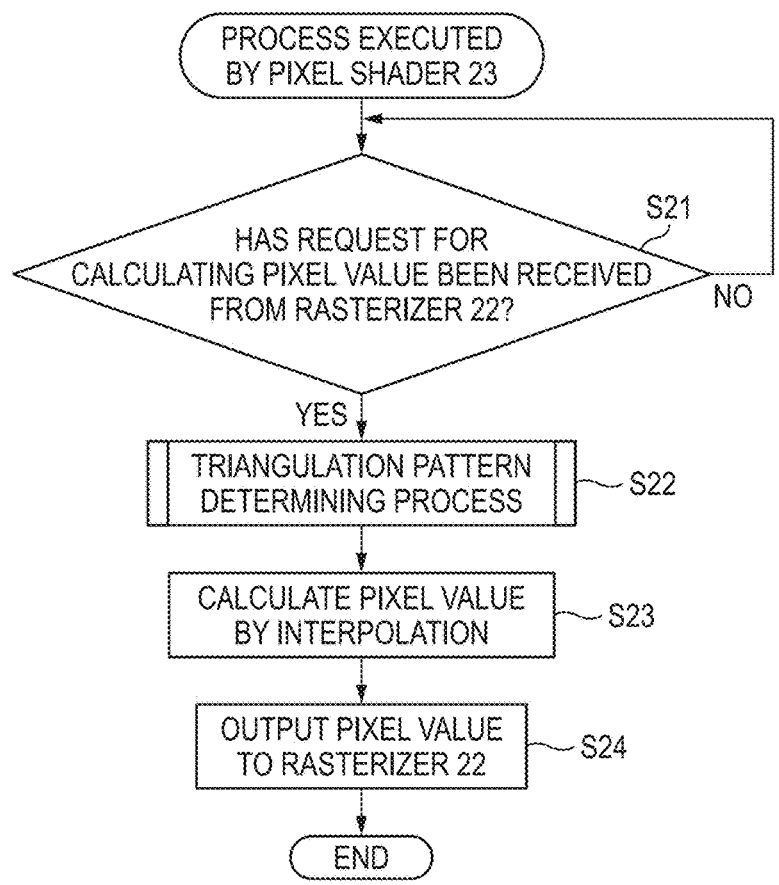
FIG. 3 is a flowchart showing the procedure of a process that is executed by a pixel shader 23 whenever it is requested to calculate pixel values from the rasterizer 22.
Figure 4:
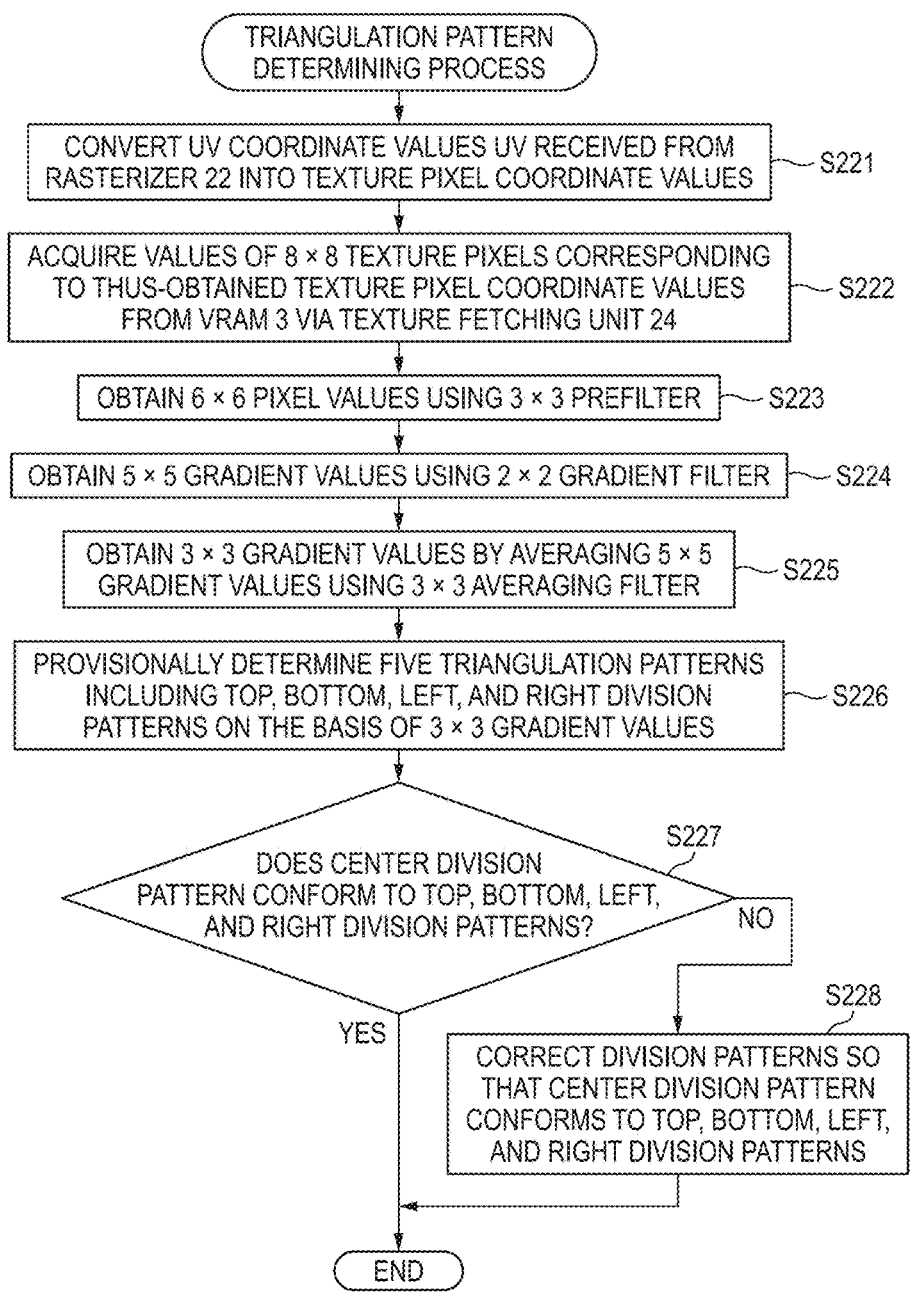
FIG. 4 is a flowchart showing the procedure of the details of a triangulation pattern determining process which is part of the process shown in FIG. 3.

FIG. 3 is a flowchart showing the procedure of a process that is executed by the pixel shader 23 whenever it is requested to calculate pixel values from the rasterizer 22. FIG. 4 is a flowchart showing the details of the procedure of a triangulation pattern determining process which is part of the process shown in FIG. 3. FIGS. 5A-5C to FIGS. 10A-10I illustrate the triangulation pattern determining process and an interpolation process which is executed on the basis of determined division patterns. The process of FIG. 3 which is executed by the pixel shader 23 is an essential part, programmed by a user, of the embodiment. The programming languages are, for example, HLSL (High Level Shading Language) and Cg.

As shown in FIG. 3, first, at step S21, the pixel shader 23 judges whether it has received a request for a calculating value of a pixel whose value needs to be determined from the rasterizer 22 together with UV coordinate values UV. If receiving such a request (S21: yes), to calculate a value using a triangulation technique, at step S22 the pixel shader 23 determines one triangulation pattern corresponding to the pixel whose value needs to be determined.

The details of the triangulation pattern determining process will be described below with reference to FIG. 4. First, at step S221, the pixel shader 23 converts the UV coordinate values UV received from the rasterizer 22 into texture pixel coordinate values. A simple method of doing so is to multiply the UV coordinate values UV by a resolution of the texture image. At step S222, the pixel shader 23 instructs the texture fetching unit 24 to read, from the VRAM 3, values of 8×8 pixels, that is, pixels (−3, −3) to (4, 4) (the top-left one of the four texture pixels surrounding the pixel having the thus-obtained texture pixel coordinate values is made a reference point (0, 0) for the sake of convenience; see FIG. 5A), by informing the texture fetching unit 24 of a texture address TA. The values of the 8×8 pixels, that is, the pixels (−3, −3) to (4, 4), are information that is necessary to determine a triangulation pattern to be used for calculating a value, to be determined, of the pixel concerned having the UV coordinate values UV by interpolation of the triangulation technique. The reason why the values of the 8×8 pixels are necessary is to, for example, increase noise immunity through lowpass filtering (described below).

Figure 5A:
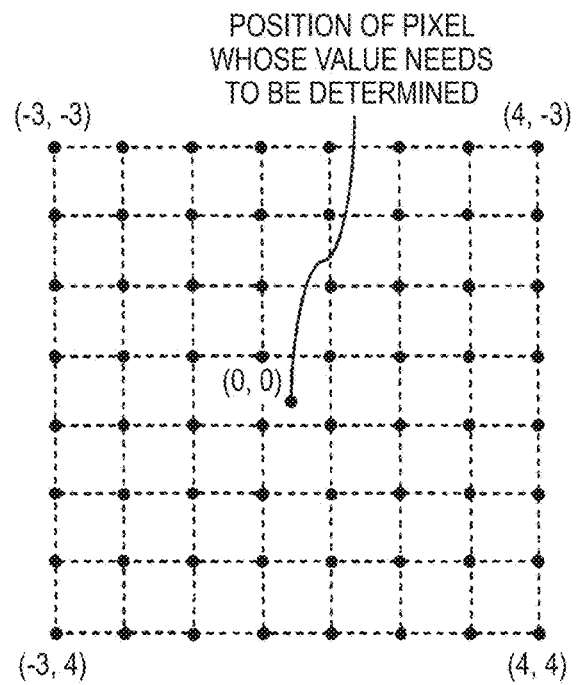
FIGS. 5A, 5B and 5C are a first set of diagrams illustrating a triangulation pattern determining process.
Figure 5B:
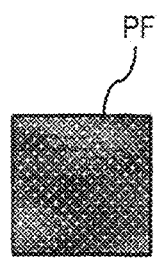
Figure 5C:
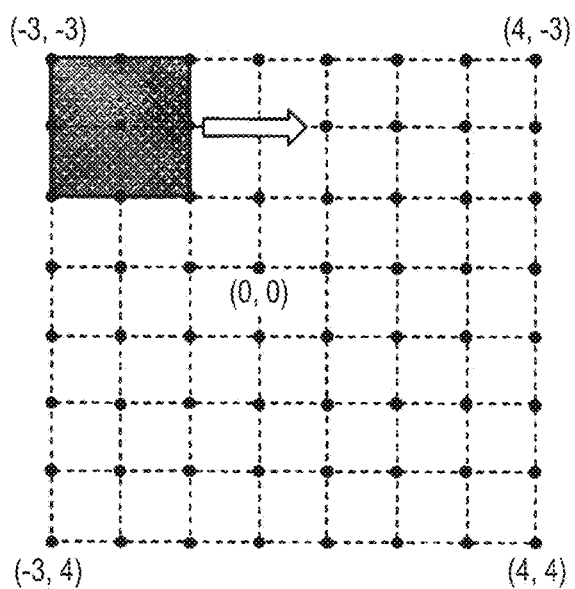
Figure 6A:
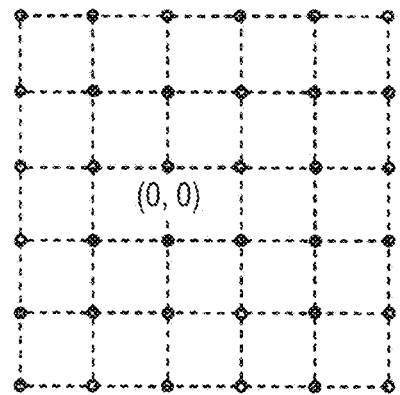
FIGS. 6A, 6B and 6C are a second set of diagrams illustrating the triangulation pattern determining process.

At step S223, when receiving the values of the 8×8 pixels shown in FIG. 5A, the pixel shader 23 prepares a prefilter PF that covers 3×3 pixels as shown in FIG. 5B, and scans the 8×8 pixels sequentially as shown in FIG. 5C while averaging the values of each set of 3×3 pixels. As a result, values of 6×6 pixels shown in FIG. 6A are obtained at the end of the scan.

Figure 6B:
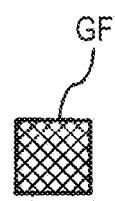
Figure 6C:
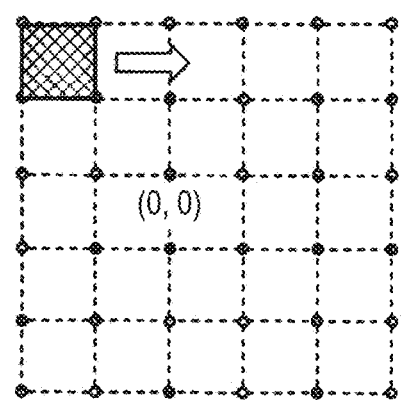
Figure 7A:
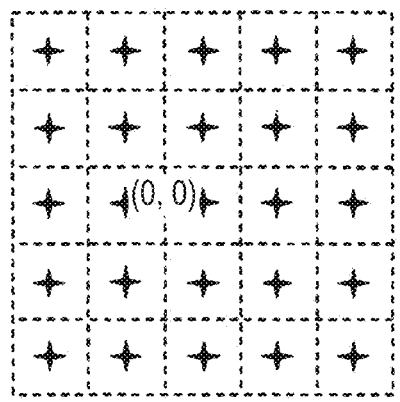
FIGS. 7A, 7B and 7C are a third set of diagrams illustrating the triangulation pattern determining process.

At step S224, the pixel shader 23 prepares a gradient filter GF that covers 2×2 pixels as shown in FIG. 6B for the thus-obtained 6×6 pixels, and scans the 6×6 pixels sequentially as shown in FIG. 6C while calculating a gradient on the basis of values of each set of 2×2 pixels, in other words, calculating a gradient value of each grid. As a result, 5×5 gradient values corresponding to respective 5×5 grids shown in FIG. 7A are obtained at the end of the scan.

Figure 7B:
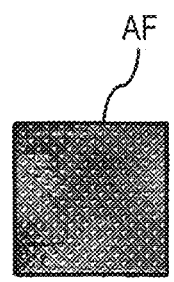
Figure 7C:
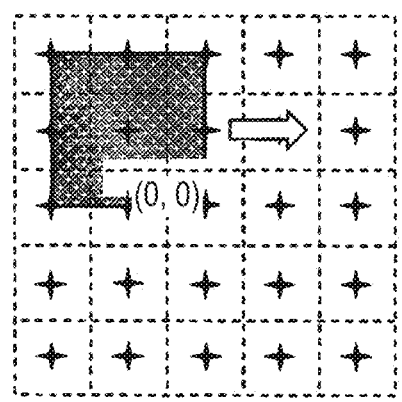

At step S225, the pixel shader 23 prepares an averaging filter AF that covers 3×3 gradient values as shown in FIG. 7B, and scans the 5×5 gradient values sequentially as shown in FIG. 7C while averaging the gradient values of each set of 3×3 gradient values. As a result, 3×3 gradient values shown in FIG. 9A are obtained at the end of the scan.

A triangulation pattern will be determined for the grid including the position where to obtain a value, that is, the grid consisting of pixels (0, 0) to (1, 1), on the basis of the thus-obtained 3×3 gradient values. First, as a preliminary explanation, triangulation patterns will be described with reference to FIG. 8. Where a gradient of pixel values is approximated with up to accuracy of 360°/16, that is, 22.5°, 15 division patterns shown in FIG. 8 are available for a division pattern to be determined for each grid region consisting of four pixel points of attention.

Figure 8:
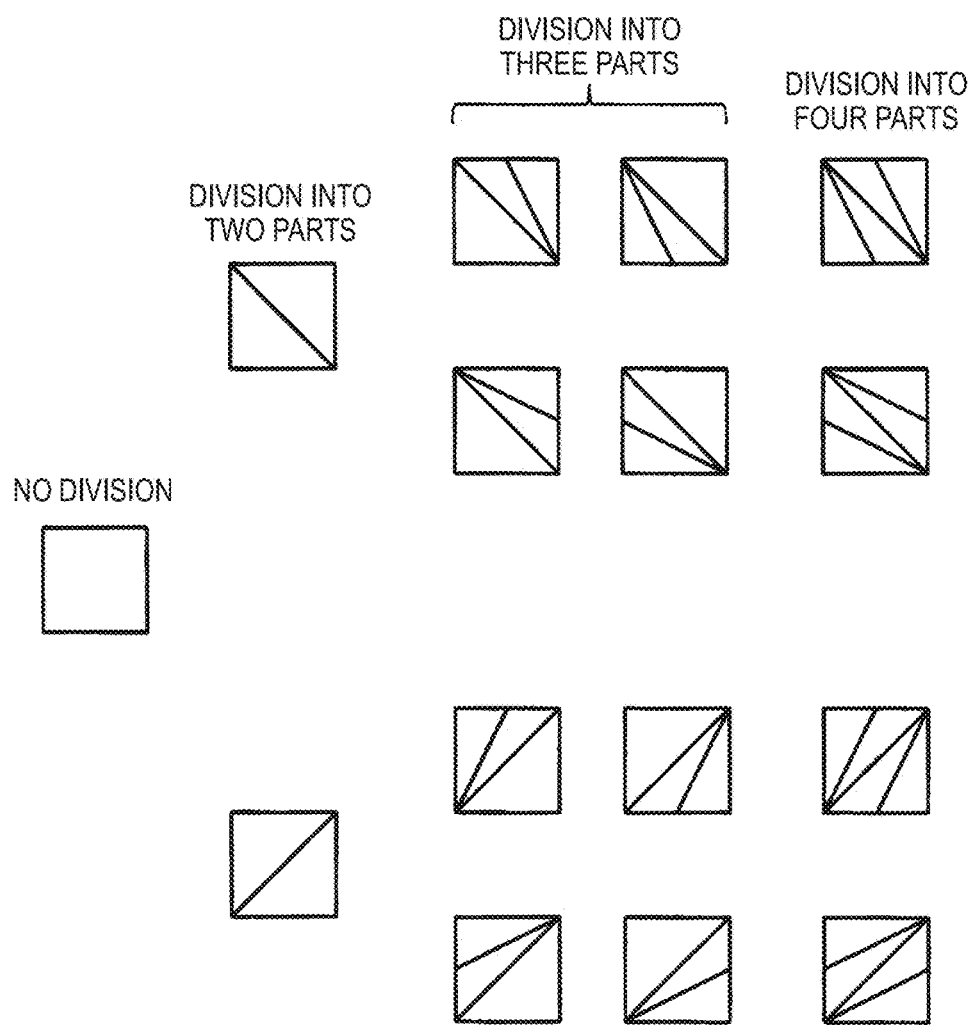
FIG. 8 is a fourth diagram illustrating a triangulation pattern determining process.
Figure 9A:
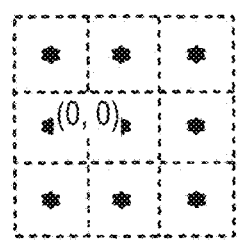
FIGS. 9A, 9B, 9C and 9D are a fifth set of diagrams illustrating the triangulation pattern determining process.
Figure 9B:
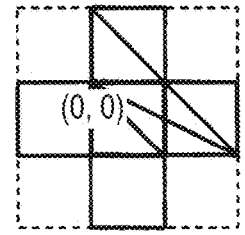
Figure 9C:

The pixel shader 23 will decide on one of the division patterns shown in FIG. 8 for the center grid, that is, the grid consisting of the texture pixels (0, 0), (0, 1), (1, 0), and (1, 1), on the basis of the 3×3 gradient values obtained as shown in FIG. 9A. To do so, at step S226, the pixel shader 23 determines division patterns for the center grid and its top, bottom, left, and right grids, respectively, on the basis of the nine gradient values. If the division pattern for the center grid is connected to the division patterns for its top, bottom, left, and right grids in conformable manners (S227: yes), the division pattern for the center grid should be a final one. For example, if division patterns are determined as shown in FIG. 9B, since they conform to each other, the pixel shader 23 decides on the current division pattern for the center grid (see FIG. 9C).

Figure 9D:
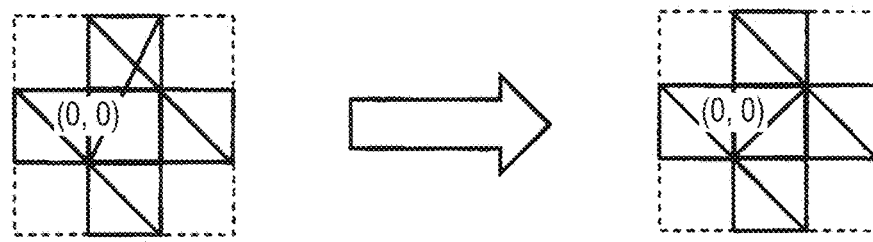

On the other hand, if the division pattern for the center grid is not connected to the division patterns for its top, bottom, left, and right grids in conformable manners (S227: no), at step S228 the pixel shader 23 corrects the division patterns as shown in FIG. 9D so that the center grid is connected to the division patterns for its top, bottom, left, and right grids in conformable manners.

Returning to FIG. 3, at step S23, the pixel shader 23 calculates a value at the position where to determine a value, that is, a value of the pixel for which the UV coordinate values UV were given by the rasterizer 22 and calculation of whose value was requested, through interpolation of the triangulation technique using the triangulation pattern obtained at step S22.

In doing so, according to the triangulation technique, surrounding texture pixels to be used for interpolation are determined according to the determined division pattern. This will be described below concisely with reference to FIGS. 10A-10I.

Figure 10A:
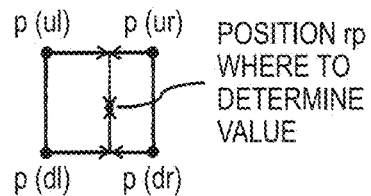
FIGS. 10A, 10B, 10C, 10D, 10E, 10F, 10G, 10H and 10I illustrate an interpolation process which is executed on the basis of determined triangulation patterns.
Figure 10B:
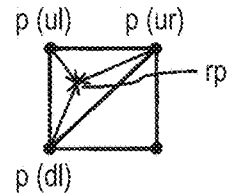

FIGS. 10A-10H show example division patterns and illustrate how to take a reference pixel. For example, in the case of a pattern without division shown in FIG. 10A, a value of a position rp where to determine a value is calculated by performing linear interpolation on the values of the vertex pixels p(ul), p(ur), p(dl), and p(dr) of the grid. In the case of a division-into-two-parts pattern shown in FIG. 10B in which a position rp where to determine a value is as shown in FIG. 10B, a value of the position rp is calculated on the basis of the values of the pixels p(ul), p(ur), and p(dl).

Figure 10C:
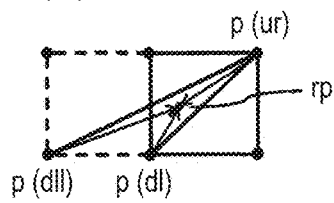
Figure 10D:
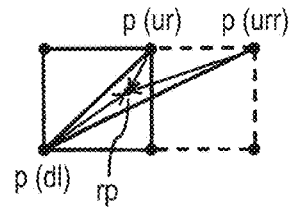
Figure 10E:
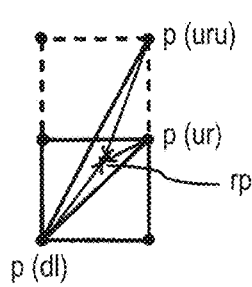
Figure 10F:
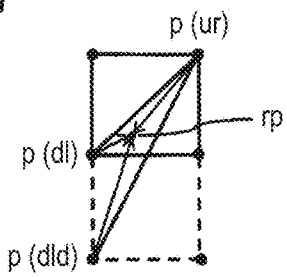

In the case of a division-into-three-parts pattern shown in FIG. 10C in which a position rp where to determine a value is as shown in FIG. 10C, a value of the position rp is calculated on the basis of the values of the pixels p(ur), p(dl), and p(dll). In the case of a division-into-three-parts pattern shown in FIG. 10D in which a position rp where to determine a value is as shown in FIG. 10D, a value of the position rp is calculated on the basis of the values of the pixels, p(ur), p(dl), and p(urr). In the case of a division-into-three-parts pattern shown in FIG. 10E in which a position rp where to determine a value is as shown in FIG. 10E, a value of the position rp is calculated on the basis of the values of the pixels, p(ur), p(dl), and p(uru). In the case of a division-into-three-parts pattern shown in FIG. 10F in which a position rp where to determine a value is as shown in FIG. 10F, a value of the position rp is calculated on the basis of the values of the pixels, p(ur), p(dl), and p(dld).

Figure 10G:
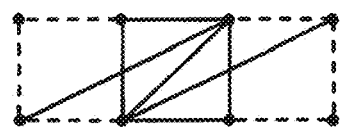
Figure 10H:
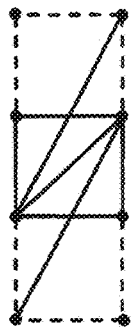

In the cases of division-into-four-parts pattern shown in FIGS. 10G and 10H, a value of a position rp in a divisional area is calculated in similar manners. Furthermore, in the cases of the other seven division patterns, a value of a position rp is calculated in similar manners.

Figure 10I:
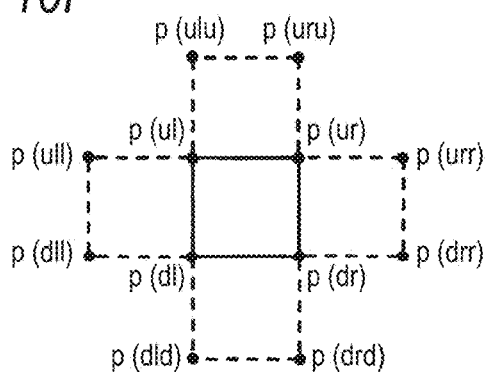

In conclusion, if values of the 12 texture pixels shown in FIG. 10I are known, a value at any position to be interpolated in the grid concerned can be determined. Since these 12 texture pixels are completely included in the 8×8 pixels shown in FIG. 5A whose values are read in to determine a triangulation pattern, it is not necessary to read in values of any part of those texture pixels from the VRAM 3.

Again returning to FIG. 3, finally, at step S24, the pixel shader 23 returns the pixel value calculated at step S23 to the rasterizer 22 as a pixel value requested by the rasterizer 22.

The embodiment in the GPU 2A having the programmable pixel shader function has been described above.

Where the texture fetching unit 24 incorporates bilinear, bicubic, or like filtering function as a standard specification, that function is canceled. This is because such a function would contend against the above-described various kinds of filtering processing of the pixel shader 23, possibly resulting in an unintended, blurred image, for example. Thus, as described above, read-in pixel values are supplied to the pixel shader 23 as they are.

The above-described various kinds of filtering processing may be modified according to the kind and magnitude of expected noise.

As described above, in the embodiment in the GPU 2A having the programmable pixel shader function, the rasterizer 22 requests the pixel shader 23 to determine a value of each pixel on the display unit 5 whose value needs to be determined by informing the pixel shader 23 of a position of the pixel. The pixel shader 23 calculates a value of the pixel by interpolation of the triangulation technique using pixel values of a texture and returns the calculated value to the rasterizer 22. As a result, a smoother enlarged image can be obtained.

Embodiment in GPU Having Compute Shader Function

Figure 11:
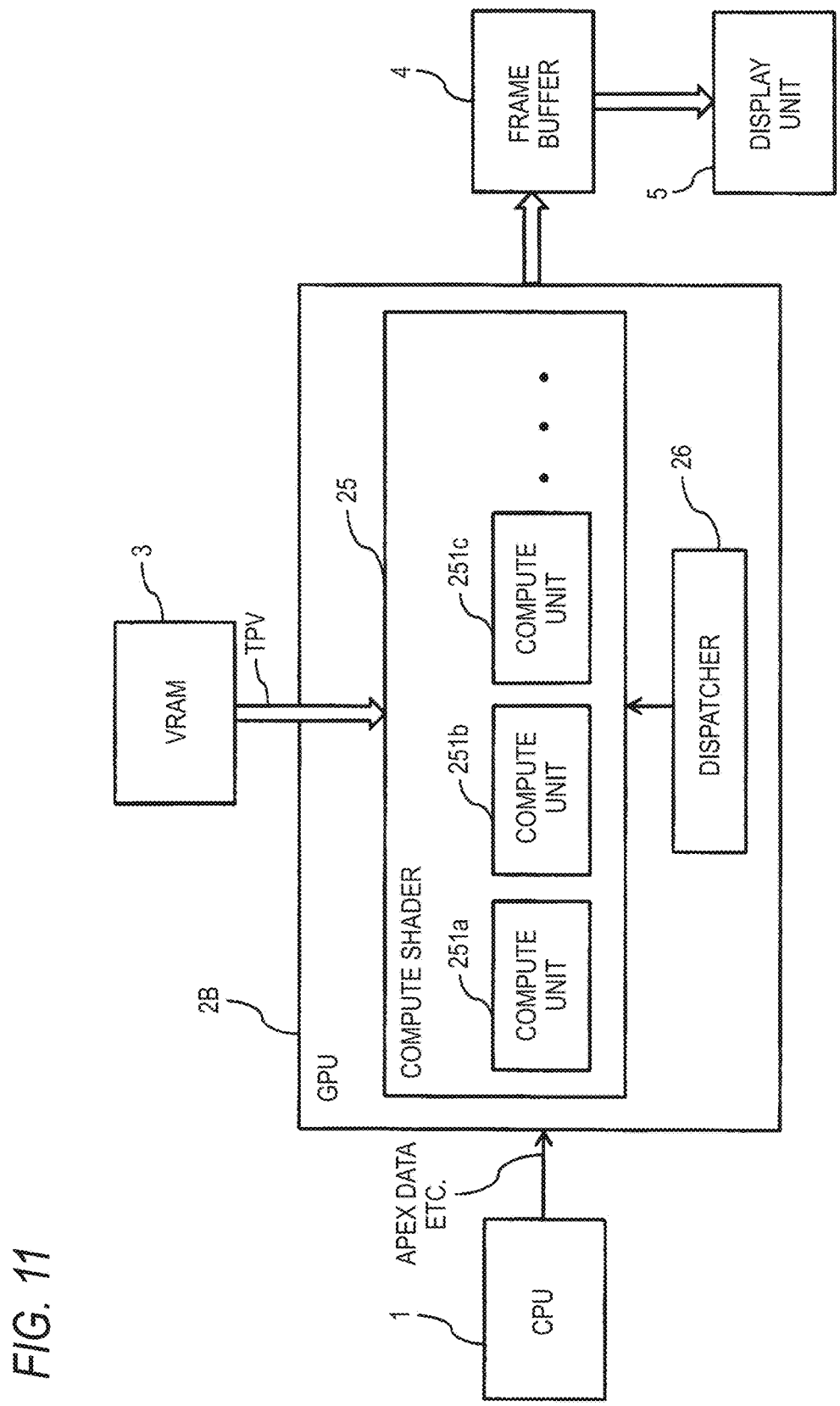
FIG. 11 is a block diagram showing the configuration of another image processing apparatus in which the image data processing method and the program therefor of the invention are embodied.

FIG. 11 is a block diagram showing the configuration of another image processing apparatus in which the image data processing method and the program therefor of the invention are embodied.

The image processing apparatus shown in FIG. 11 is equipped with a display unit 5 on which a 3D graphics image is displayed; a VRAM 3 which is stored with data of multiple textures; a CPU 1 which supplies at least vertex data of a 3D model formed by polygons, information indicating a texture, and information relating to division for divisional processing of each texture; a GPU 2B which determines, collectively, triangulation patterns of respective divisional units of the designated texture stored in the VRAM 3 on the basis of the vertex data, the information indicating the texture, and the division information, calculates values of display pixels on the display unit 5 collectively through interpolation using a triangulation technique on the basis of all of the determined triangulation patterns according to a magnification factor determined on the basis of the vertex data, and outputs the calculated values of the display pixels; and a frame buffer 4 which is disposed upstream of the display unit 5 and stores pixel data that are output from the GPU 2B.

As shown in FIG. 11, the GPU 2B has a compute shader 25 and a dispatcher 26. The compute shader 25 has multiple compute units 251a, 251b, 251c, ... which take charge of and process respective divisional textures.

Figure 12:
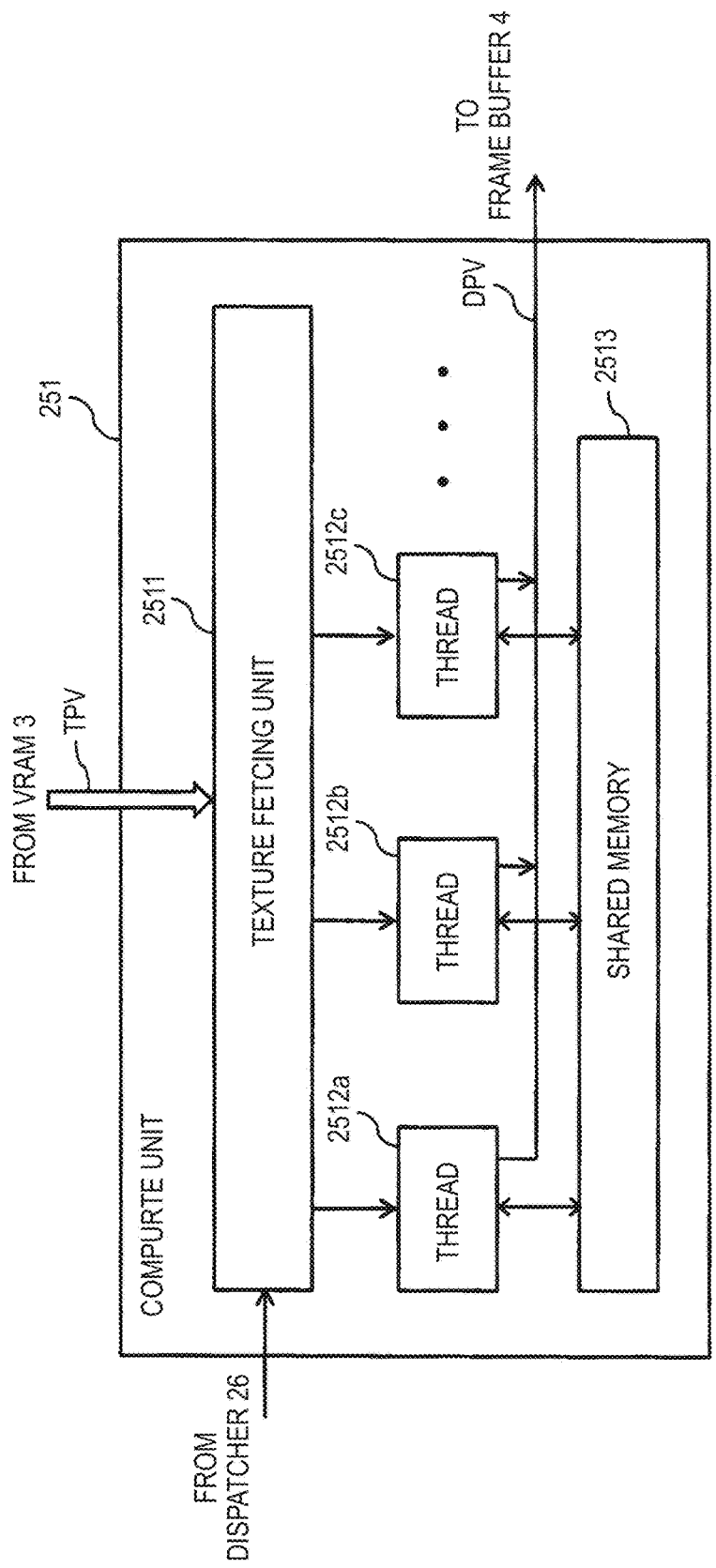
FIG. 12 is a block diagram showing a detailed configuration of each compute unit 251.

FIG. 12 is a block diagram showing a detailed configuration of each compute unit 251. As shown in FIG. 12, each compute unit 251 is equipped with a texture fetching unit 2511 for reading in pixels TPV of a divisional texture to take charge of from the VRAM 3, multiple threads 2512a, 2512b, 2512c, ... for processing, in parallel, the respective pixels TPV of the divisional texture that are read in via the texture fetching unit 2511, and a shared memory 2513 for storing information occurring halfway during processing of each thread 2512 and its processing result. The number of threads 2512 is equal to 768, for example. The shared memory 2513 is a cache memory of 32 kilobytes, for example.

Next, how the image processing apparatus shown in FIG. 11 operates, that is, its processing procedure, will be described.

Figure 13:
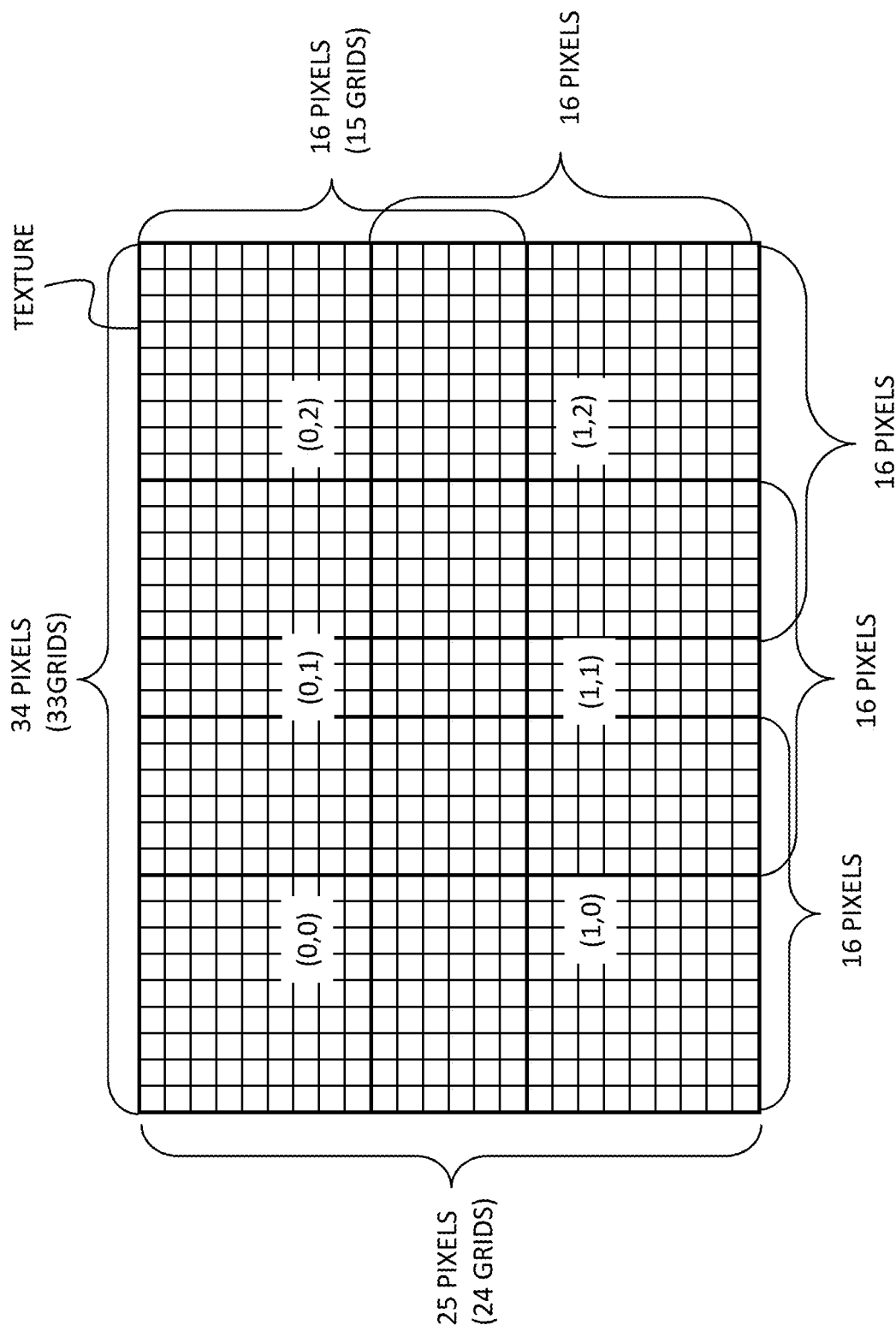
FIG. 13 illustrates an example of how a texture is divided and processed.

How a texture stored in the VRAM 3 is divided and processed is designed in advance. FIG. 13 illustrates an example of how a texture is divided and processed. In this example, it is assumed that each divisional texture consists of 16×16 texture pixels and a texture is divided into 3×2 divisional textures (0, 0) to (1, 2). The reason why the adjoining ones of the divisional textures overlap with each other by six grids is to make it possible to determine division patterns at the division boundaries without losing information in a process of determining triangulation patterns (described later). If there were no overlap, information would be lost in filtering processing (described later).

The CPU 1 informs, in advance, the GPU 2B of, in addition to vertex data and information indicating a texture, "division information," that is, such information as the number of pixels constituting each divisional texture, (e.g., 16×16 (mentioned above)) and the number of divisional textures. The dispatcher 26 of the GPU 2B recognizes a necessary number of compute units 251 and informs the compute units 251 of divisional textures that they should take charge of and process in the form of group IDs, respectively. As a result, in the example of FIG. 13, a setting is made so that, for example, the compute units 251a, 251b, 251c, 251d, 251e, and 251f should take charge of the divisional textures (0, 0), (0, 1), (0, 2), (1, 0), (1, 1), and (1, 2), respectively, and they are informed of group IDs (0, 0), (0, 1), (0, 2), (1, 0), (1, 1), and (1, 2), respectively.

Figure 14:
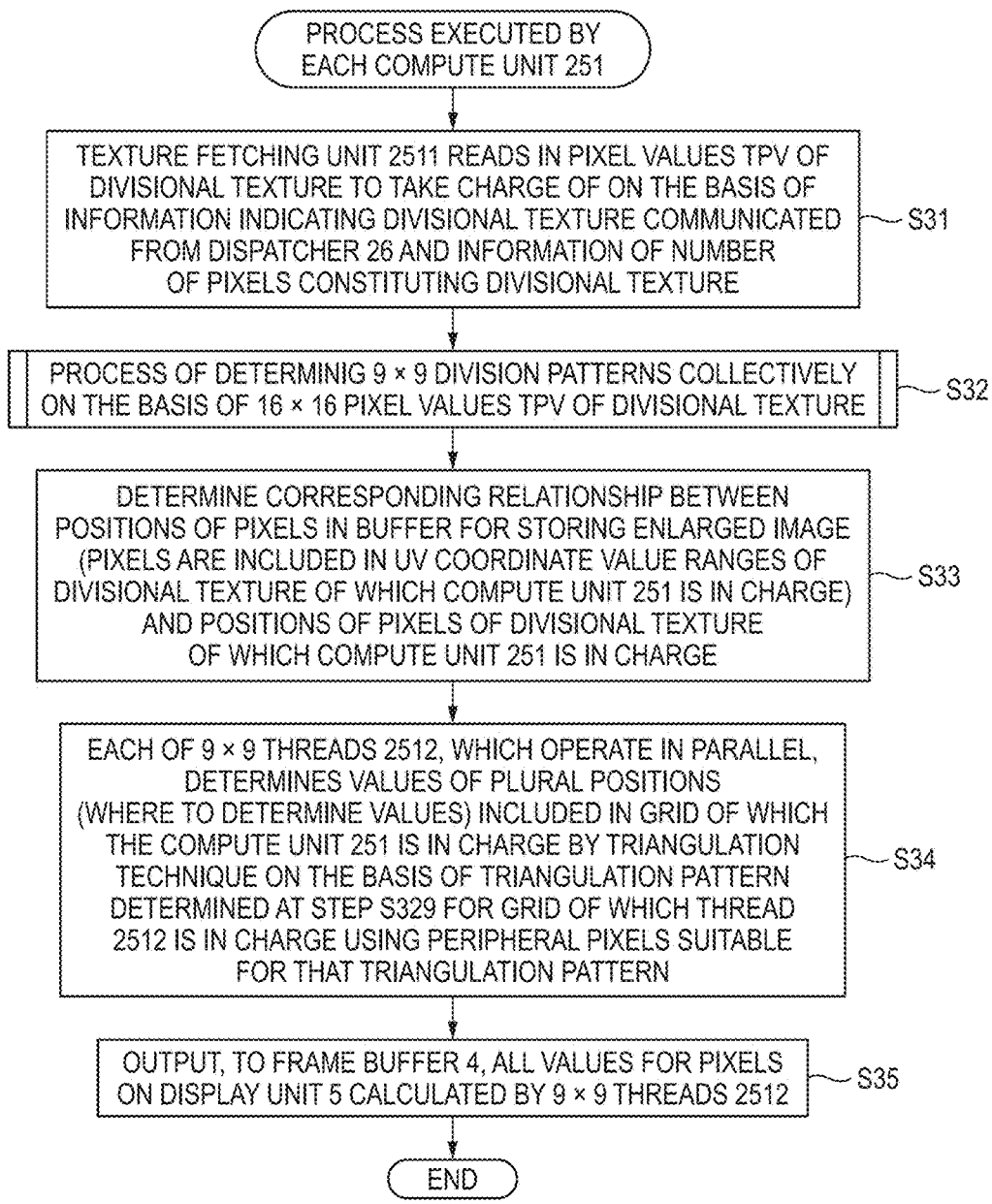
FIG. 14 is a flowchart showing the processing procedure of each compute unit 251.

FIG. 14 is a flowchart showing the processing procedure of each compute unit 251. This process is embedded in each compute unit 251 in the form of a program, and the compute units 251 can operate in parallel. The programming language is HLSL or Cg, for example.

The processing procedure of each compute unit 251 will be described below. First, at step S31, the texture fetching unit 2511 of each compute unit 251 reads in pixel values TPV (of 16×16 pixels) of a divisional texture to take charge of on the basis of UV coordinate value ranges calculated from a group ID communicated from the dispatcher 26. At step S32, the compute unit 251 determines 9×9 triangulation patterns collectively on the basis of the read-in 16×16 pixel values TPV of the divisional texture.

Figure 15:
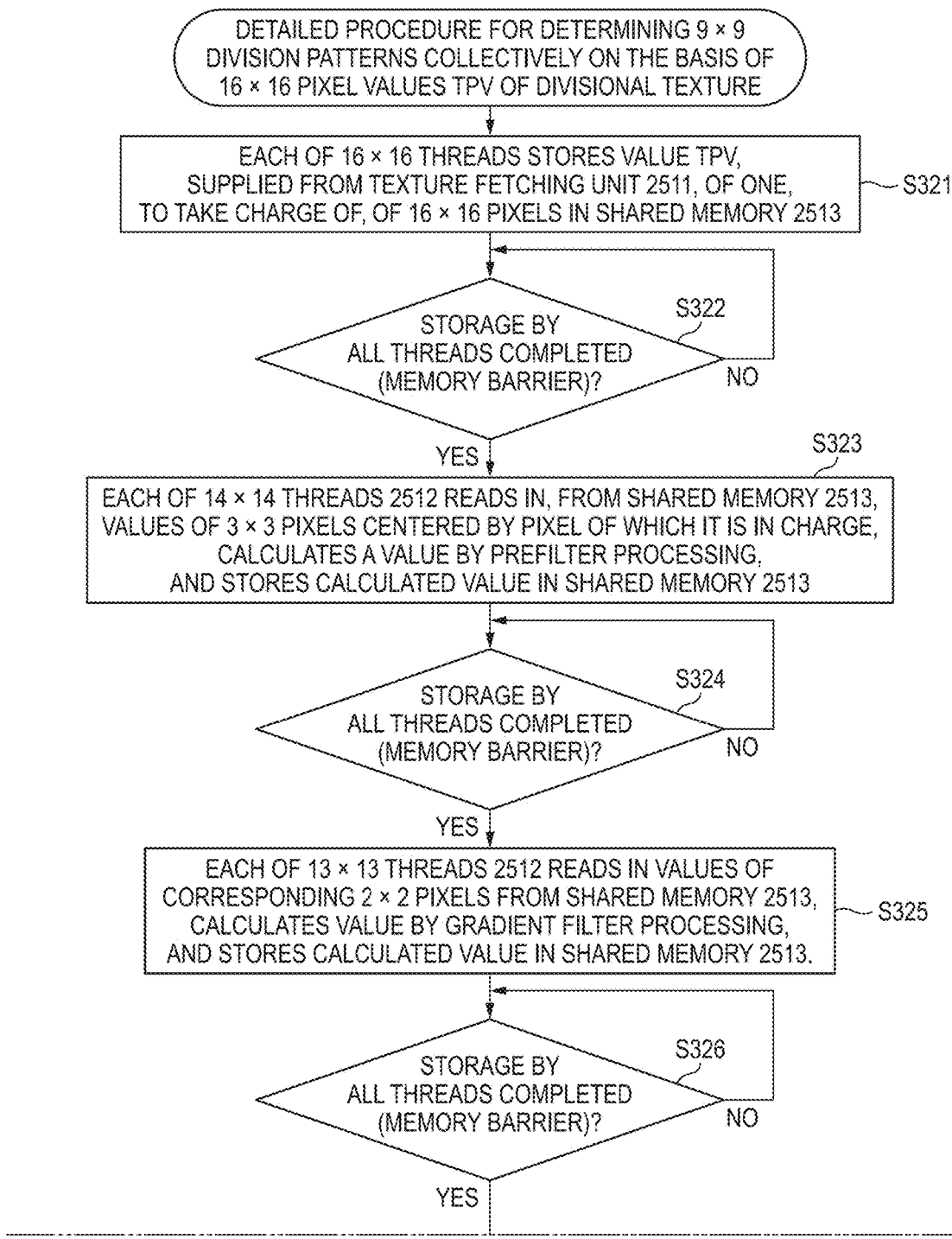
FIG. 15 is a flowchart showing a detailed procedure of a process (step S32) of determining 9×9 divisional patterns collectively on the basis of 16×16 pixel values TPV of a divisional texture.

FIG. 15 is a flowchart showing a detailed procedure of a process of determining 9×9 divisional patterns collectively on the basis of 16×16 pixel values TPV of a divisional texture. FIGS. 16-20 are diagrams illustrating this procedure.

Figure 16:
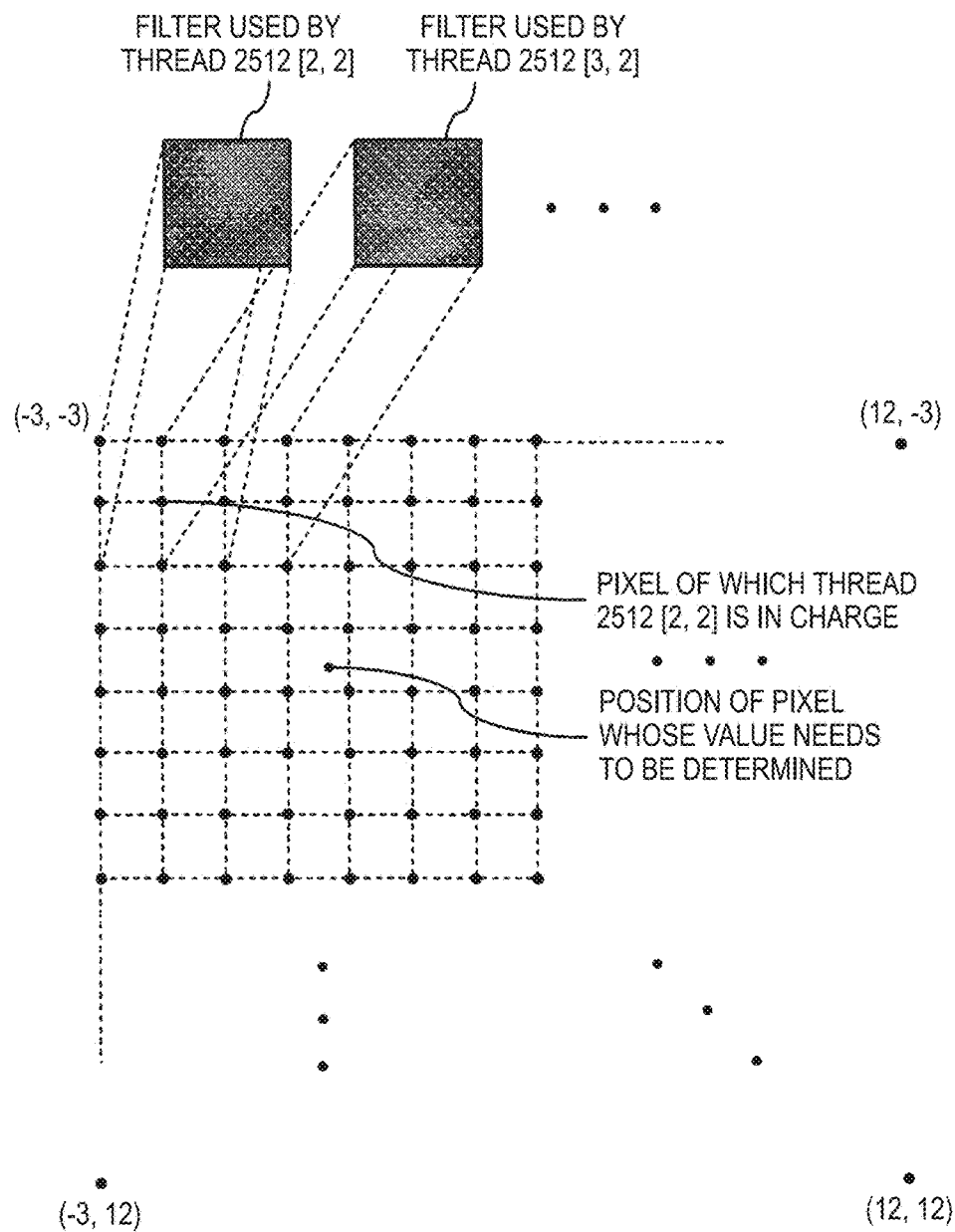
FIG. 16 is a first diagram illustrating the triangulation pattern determining process.

As shown in FIG. 16, the pixels of the read-in 16×16 pixel values TPV of the divisional texture to take charge of are expressed as pixels (x, y) (x=−3 to 12, y=−3 to 12). On the other hand, 256 threads are selected from the threads 2512*a*, 2512*b*, . . . and are expressed as threads 2512 [i, j] (i=1 to 16, j=1 to 16) that correspond to the respective two-dimensional pixels (x, y). The threads 2512 [i, j] are in one-to-one correspondence with the pixels (x, y) or average values and process them. In specific example shown in FIGS. 16-20, the pixel (−3, −3) corresponds to the thread 2512 [1, 1], pixel (12, −3) corresponds to the thread 2512 [16, 1], pixel (−3, 12) corresponds to the thread 2512 [1, 16], and, finally, pixel (12, 12) corresponds to the thread 2512 [16, 16]. However, this corresponding relationship is just one for convenience of description.

First, at step S321, the threads 2512 [i, j] (i=1 to 16, j=1 to 16) store the values TPV of the pixels (x, y) (x=−3 to 12, y=−3 to 12) of which they are in charge in the shared memory 2513, respectively. At step S322, the compute unit 251 waits until completion of the storage by all of the threads 2512.

At step S323, as shown in FIG. 16, each of 14×14 threads 2512 [i, j] (i=2 to 15, j=2 to 15) reads in, from the shared memory 2513, the values of 3×3 pixels centered by the pixel of which it is in charge, calculates a value by prefilter processing, and stores the calculated value in the shared memory 2513. Although this filtering processing is the same as the filtering processing described above with reference to FIGS. 5B and 5C, this embodiment is different from the first embodiment in that the threads 2512 perform the prefilter processing in parallel. At step S324, the compute unit 251 waits until completion of the storage by all of the threads 2512 (i=2 to 15, j=2 to 15). At the time point of the end of execution of step S324, 14×14 pieces of information are stored in the shared memory 2513.

Figure 17:
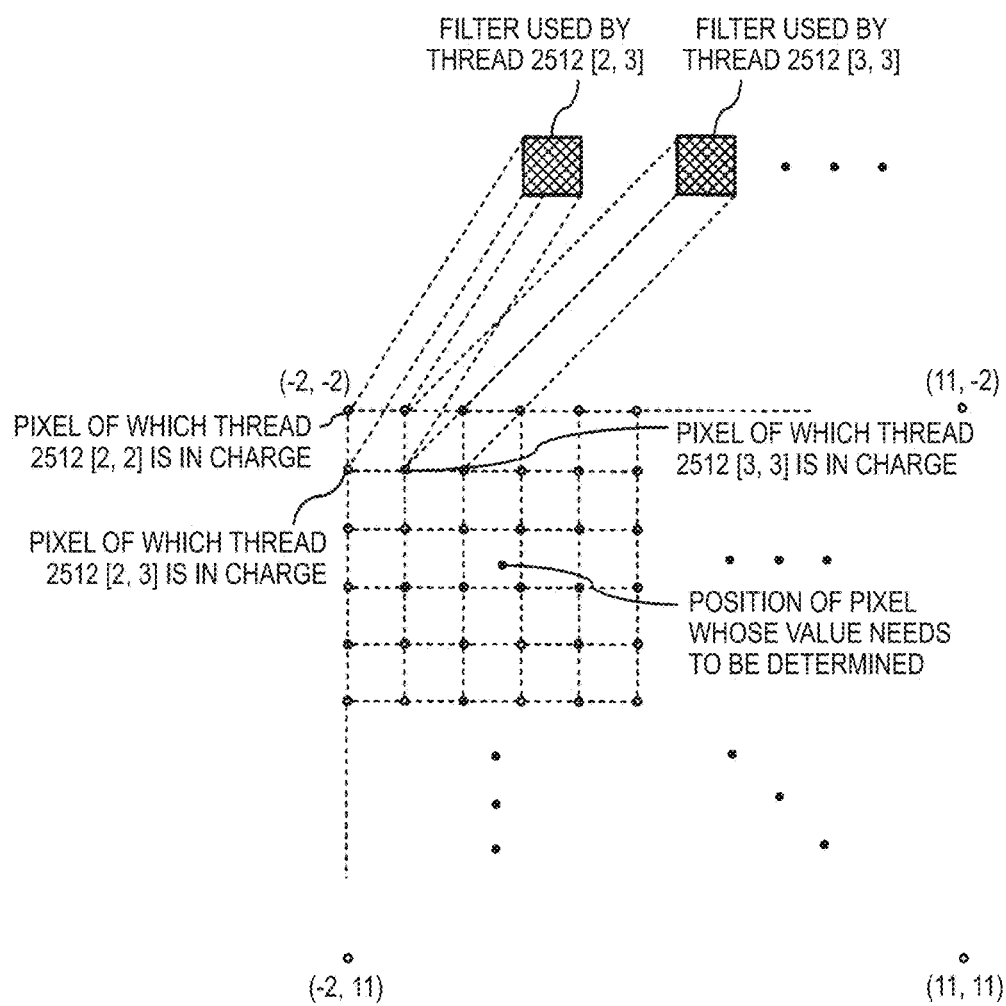
FIG. 17 is a second diagram illustrating the triangulation pattern determining process.

At step S325, as shown in FIG. 17, each of 13×13 threads 2512 [i, j] (i=2 to 14, j=3 to 15) reads in, from the shared memory 2513, the values of 2×2 pixels constituting a grid including, as the bottom-left pixel, the pixel of which it is in charge, calculates a value by gradient filter processing, and stores the calculated value in the shared memory 2513. Although this gradient filter processing is the same as the filtering processing described above with reference to FIGS. 6B and 6C, this embodiment is different from the first embodiment in that the threads 2512 perform the gradient filter processing in parallel. At step S326, the compute unit 251 waits until completion of the storage by all of the threads 2512 (i=2 to 14, j=3 to 15). At the time point of the end of execution of step S326, 13×13 pieces of information are stored in the shared memory 2513.

Figure 18:
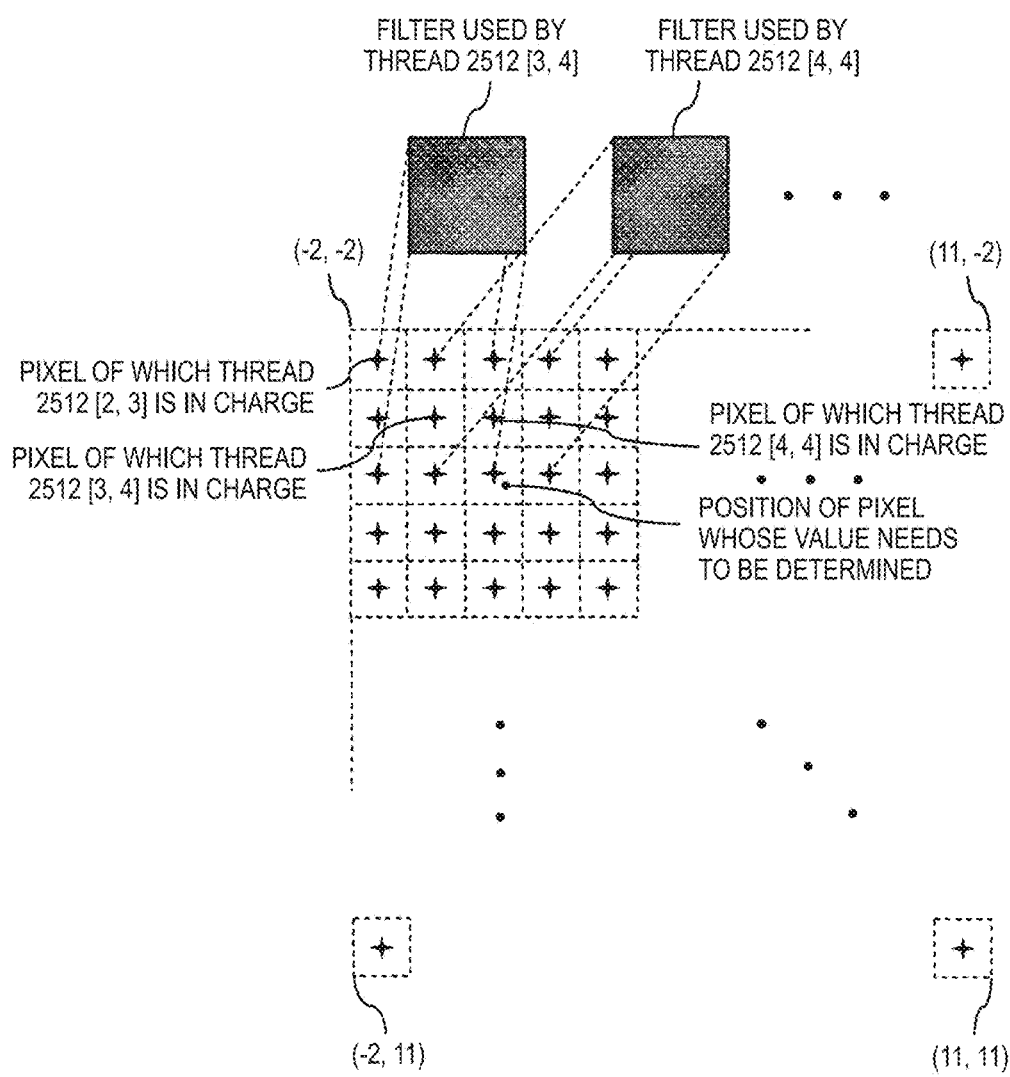
FIG. 18 is a third diagram illustrating the triangulation pattern determining process.

At step S327, as shown in FIG. 18, each of 11×11 threads 2512 [i, j] (i=3 to 13, j=4 to 14) reads in, from the shared memory 2513, the values of 3×3 pixels including the pixel of which it is in charge as the pixel on the bottom-left of and closest to the center of a grid, calculates a value by average filter processing, and stores the calculated value in the shared memory 2513. Although this averaging filter processing is the same as the filtering processing described above with reference to FIGS. 7B and 7C, this embodiment is different from the first embodiment in that the threads 2512 perform the averaging filter processing in parallel. At step S328, the compute unit 251 waits until completion of the storage by all of the threads 2512 (i=3 to 13, j=4 to 14). At the time point of the end of execution of step S328, 11×11 pieces of information are stored in the shared memory 2513.

Figure 19:
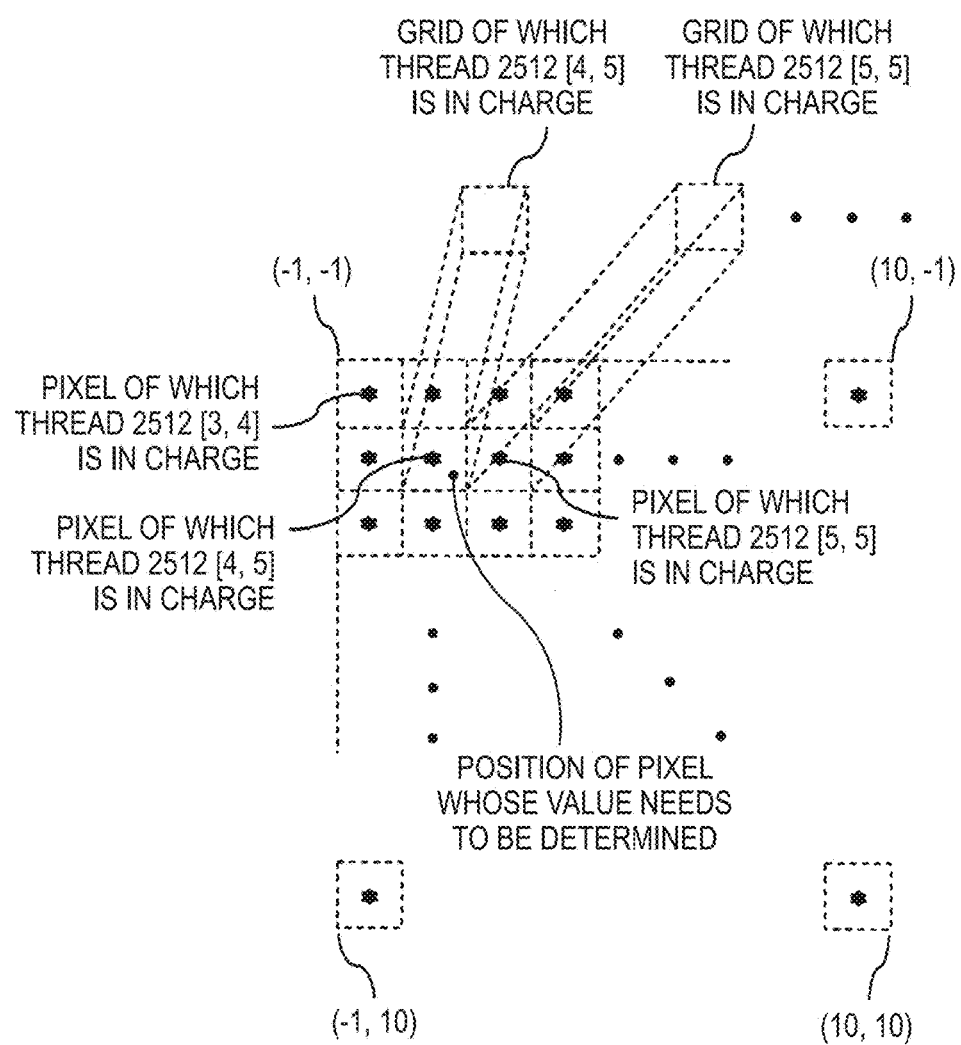
FIG. 19 is a fourth diagram illustrating the triangulation pattern determining procedure.

At step S329, as shown in FIG. 19, each of 9×9 threads 2512 [i, j] (i=4 to 12, j=5 to 13) reads in, from the shared memory 2513, the values of 3×3 pixels centered by the pixel of which it is in charge. The thread 2512 determines division patterns (see FIG. 8) for the grid of which the thread 2512 is in charge and its top, bottom, left, and right grids, respectively, on the basis of the read-in values. Following the same procedure as described above with reference to FIG. 4, the thread 2512 decides on the central division pattern for the grid of which the thread 2512 is in charge if it conforms to the division patterns for the top, bottom, left, and right grids. If not, the thread 2512 corrects the division patterns. The thread 2512 decides on a finally determined central division pattern for the grid of which the thread 2512 is in charge, and stores it in the shared memory 2513 (information that is stored actually is a pattern number or the like).

Although this processing is the same as described above with reference to FIGS. 9A-9D, this embodiment is different from the first embodiment in that the threads 2512 perform the processing in parallel. At step S330, the compute unit 251 waits until completion of the storage by all of the threads 2512 (i=4 to 12, j=5 to 13). At the time point of the end of execution of step S330, information relating to 9×9 triangulation patterns is stored in the shared memory 2513.

Figure 20:
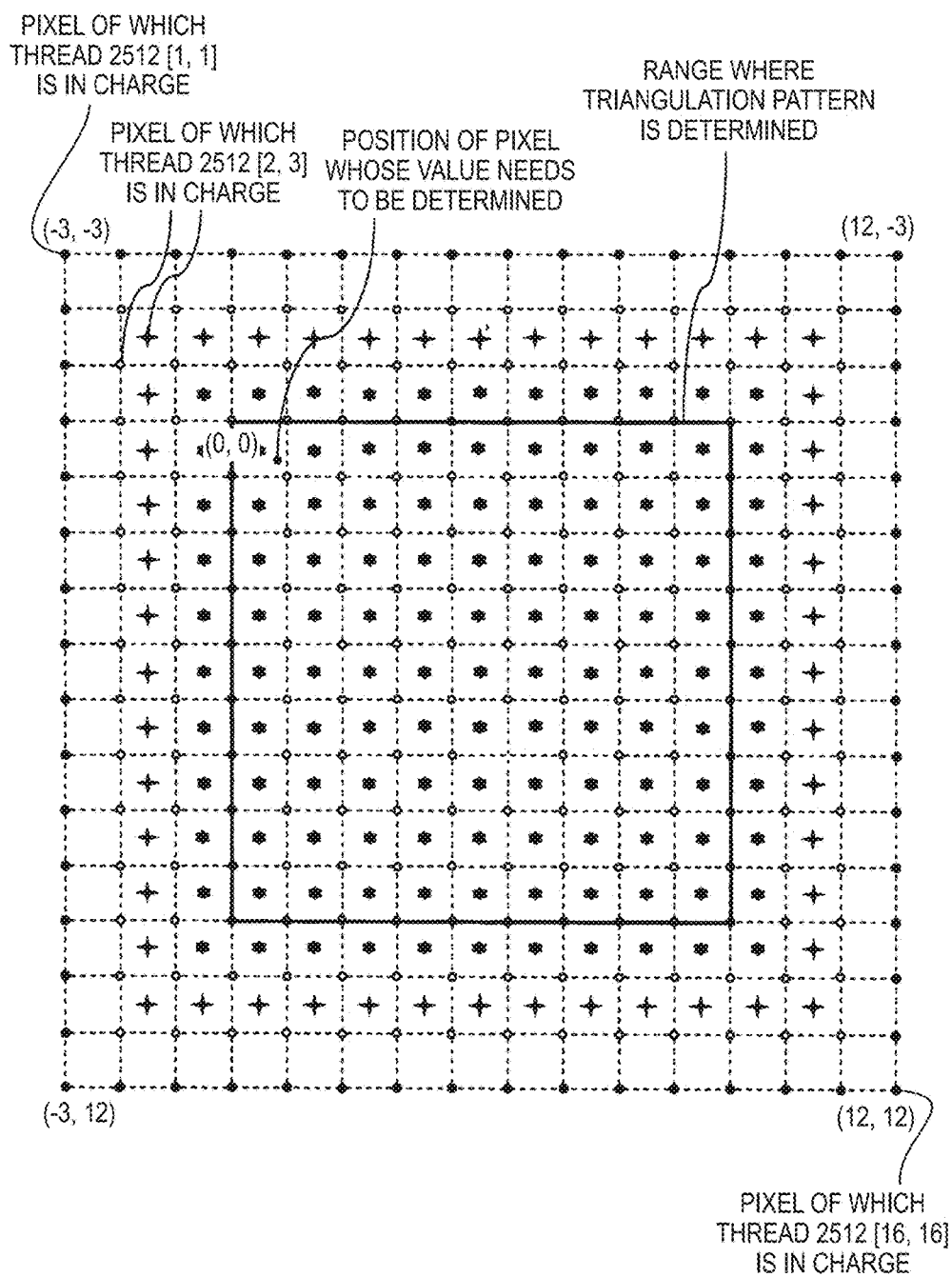
FIG. 20 is a fifth diagram illustrating the triangulation pattern determining process.

The reason why the adjoining ones of the divisional textures overlap with each other by six grids as shown in FIG. 13 is to make it possible to obtain information relating to 9×9 triangulation patterns finally as described above from the 16×16 texture pixels as shown in FIG. 20. If there were no overlap, regions would occur where information relating to triangulation patterns cannot be obtained.

Returning to FIG. 14, at step S33, each of the compute units 251*a*, 251*b*, 251*c*, . . . (in the example of FIG. 13, the compute units 251*a*-251*f*) determines a corresponding relationship between the positions (where to determine RGB values) of display pixels in a buffer for storing an enlarged image that is secured according to a texture magnification factor supplied from the CPU 1 (the display pixels will be included in UV coordinate value ranges of a divisional texture of which the compute unit 251 is in charge when the positions are made UV coordinate values) and the positions of pixels of the divisional texture of which the compute unit 251 is in charge. (Positions where to determine values become higher in resolution if the magnification factor exceeds a certain value).

At step S34, each of the 9×9 threads 2512 [i, j] (i=4 to 12, j=5 to 13) that are included in each of the compute units 251*a*, 251*b*, 251*c*, . . . (in the example of FIG. 13, compute units 251*a*-251*f*) and operate in parallel determines values of multiple positions (where to determine values) included in the grid of which the compute unit 251 is in charge by a triangulation technique on the basis of the triangulation pattern determined at step S329 for the grid of which the thread 2512 is in charge using peripheral pixels (see FIG. 10) suitable for that triangulation pattern.

Finally, at step S35, each of the compute units 251*a*, 251*b*, 251*c*, . . . (in the example of FIG. 13, compute units 251*a*-251*f*) outputs, to the frame buffer 4, all values for pixels on the display unit 5 calculated by the 9×9 threads 2512 [i, j] (i=4 to 12, j=5 to 13) included in the compute unit 251. To increase the efficiency of use of the threads 2512, multiple threads 2512 may be assigned to each of 9×9 pieces of triangulation information.

Although in the above embodiment that is directed to the GPU having the compute shader function the number of texture pixels of which each compute unit 251 is in charge is 16×16, the invention is not limited to this case; the number texture pixels may be determined according to necessary filtering processing. However, naturally, it is limited by the number of threads 2512 included in each compute unit 251.

Although in the above embodiment that is directed to the GPU having the compute shader function compute units 251 process, in parallel, respective divisional textures obtained by dividing a texture and threads 2512 included in compute units 251, each of which takes charge of one pixel, determine triangulation patterns in parallel. And pieces of interpolation processing are performed in parallel on the basis of the determined triangulation patterns using the triangulation technique. As a result, a smooth enlarged image can be obtained at high speed.

The image data processing method and the program therefor in an image processor according to the invention can be applied to GPUs installed in game machines, general-purpose PCs, smartphones, etc.

Although the invention has been described above in relation to preferred embodiments and modifications thereof, it will be understood by those skilled in the art that other variations and modifications can be effected in these preferred embodiments without departing from the scope and spirit of the invention.

What is claimed is:

1. An image data processing method being performed in an image processor comprising:
   a vertex shader which determines, based on received vertex data of a polygon, positions on a display unit corresponding to the vertex data;
   a rasterizer which determines pixels on the display unit that are necessary to display, on the display unit, an image in which a designated texture is mapped on the polygon based on positions of apices on the display unit determined by the vertex shader; and
   a pixel shader which determines, whenever information indicating a position of an individual pixel on the display unit where to determine a pixel value is received from the rasterizer, a pixel value of the position through interpolation using values of prescribed texture pixels around the position to display, on the display unit, the image in which the designated texture is mapped on the polygon, wherein:
   the pixel shader determines, whenever the information indicating the position of the individual pixel on the display unit where to determine the pixel value is received from the rasterizer, a triangulation pattern of a triangulation technique that relates to a pixel grid, including the position, of the texture based on pixels constituting the pixel grid and pixels around the pixel grid, and determines a pixel value of the position through interpolation using the values of the prescribed texture pixels around the position based on the determined triangulation pattern.

2. The image data processing method according to claim 1, wherein, in determining a triangulation pattern, the pixel shader calculates gradient values of values of pixels constituting each grid and values of pixels around the grid while performing lowpass filter processing thereon.

3. The image data processing method according to claim 1, wherein, in determining a triangulation pattern, the pixel shader provisionally determines a triangulation pattern for a pixel grid, including the position, of the texture and triangulation patterns for grids located over, under, on the left of, and on the right of the pixel grid, and, if the provisionally determined triangulation pattern for the pixel grid, including the position, of the texture does not conform to the provisionally determined triangulation patterns for the grids located over, under, on the left of, and on the right of the pixel grid, finally determines a triangulation pattern for the pixel grid, including the position, of the texture by causing the former to conform to the latter.

4. A non-transitory computer readable medium storing an image processing program causing an image processor to perform rendering processing, wherein the image processing program causes the image processor to execute:
   a vertex shader process of determining, based on received vertex data of a polygon, positions on a display unit corresponding to the vertex data;
   a rasterizer process of determining pixels on the display unit that are necessary to display, on the display unit, an image in which a designated texture is mapped on the polygon based on positions of apices on the display unit determined by the vertex shader process; and
   a pixel shader process of determining, whenever information indicating a position of an individual pixel on the display unit where to determine a pixel value is received from the rasterizer process, a pixel value of the position through interpolation using values of prescribed texture pixels around the position to display, on the display unit, the image in which the designated texture is mapped on the polygon, wherein:
   the pixel shader which determines, whenever the information indicating the position of the individual pixel on the display unit where to determine the pixel value is received from the rasterizer process, a triangulation pattern of a triangulation technique that relates to a pixel grid, including the position, of the texture based on pixels constituting the pixel grid and pixels around the pixel grid, and determines a pixel value of the position through interpolation using the values of the prescribed texture pixels around the position based on the determined triangulation pattern.

5. An image data processing method in an image processor that has a compute shader having multiple compute units and performs rendering processing, wherein:
   the multiple compute units process, in parallel, divisional textures that are produced by dividing a texture and of which the multiple threads are in charge, respectively, and each of the multiple compute units has multiple threads which operate in parallel according to a program;
   each of the multiple compute units determines, whenever information indicating a position of an individual pixel whose value needs to be determined is received, collectively, using the multiple threads, triangulation patterns to be used for a triangulation technique for a prescribed number of grids among grids that are formed by pixels constituting the divisional texture, based on values of the pixels constituting the divisional texture;

each of the multiple compute units determines positions, corresponding to pixel positions on a buffer that stores an enlarged image, in the prescribed number of grids; and each of the multiple compute units determines, using a thread corresponding to each grid, a value of a pixel on the display unit corresponding to a position included in the grid through interpolation using values of peripheral pixels in the divisional texture based on the triangulation pattern determined for the grid.

6. The image data processing method according to claim 5, wherein, in determining triangulation patterns collectively, the multiple threads perform processing while storing values obtained during the course of the processing in a memory that is shared by the multiple threads.

7. The image data processing method according to claim 5, wherein:

in determining triangulation patterns collectively using the multiple threads, each of the multiple compute units calculates gradient values of values of pixels constituting each grid and values of pixels around the grid while performing lowpass filter processing thereon; and each of the multiple compute units is assigned, in an overlapped manner, boundary portions of adjoining divisional textures by such an amount that the number of triangulation patterns determined is reduced by the lowpass filter processing so as to become small relative to the number of pixels used of the divisional texture.

8. The image data processing method according to claim 5, wherein, in determining triangulation patterns collectively using the multiple threads, each of the multiple compute units provisionally determines a triangulation pattern for a grid corresponding to each thread and triangulation patterns for grids located over, under, on the left of, and on the right of the grid corresponding to the thread, and, if the provisionally determined triangulation pattern for the grid corresponding to the thread does not conform to the provisionally determined triangulation patterns for the grids located over, under, on the left of, and on the right of the grid corresponding to the thread, finally determines a triangulation pattern for the grid corresponding to the thread by causing the former to conform to the latter.

* * * * *